Aug. 4, 1936.   A. J. ASMUSSEN ET AL   2,049,756
APPARATUS FOR CONTINUOUSLY WRAPPING ICE CREAM OR OTHER PRODUCTS
Original Filed Oct. 29, 1934    3 Sheets-Sheet 2

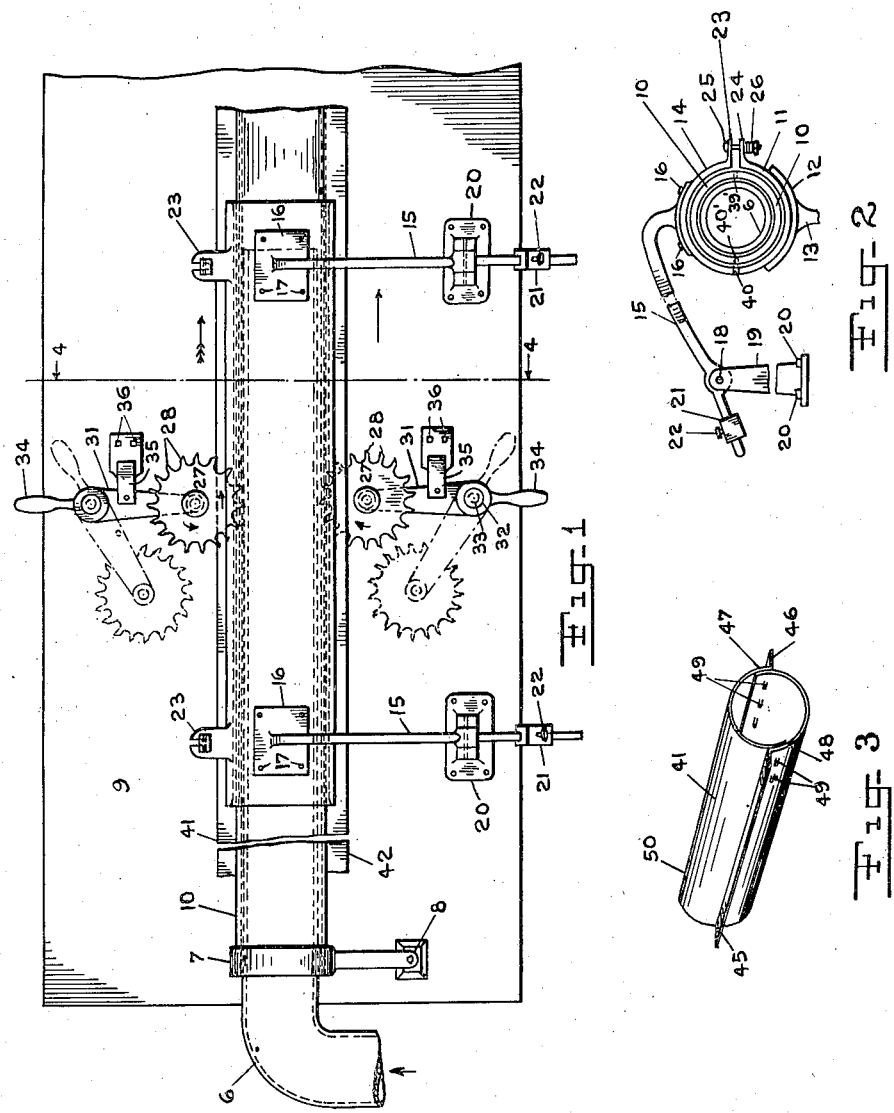

INVENTORS
BY
ATTORNEY.

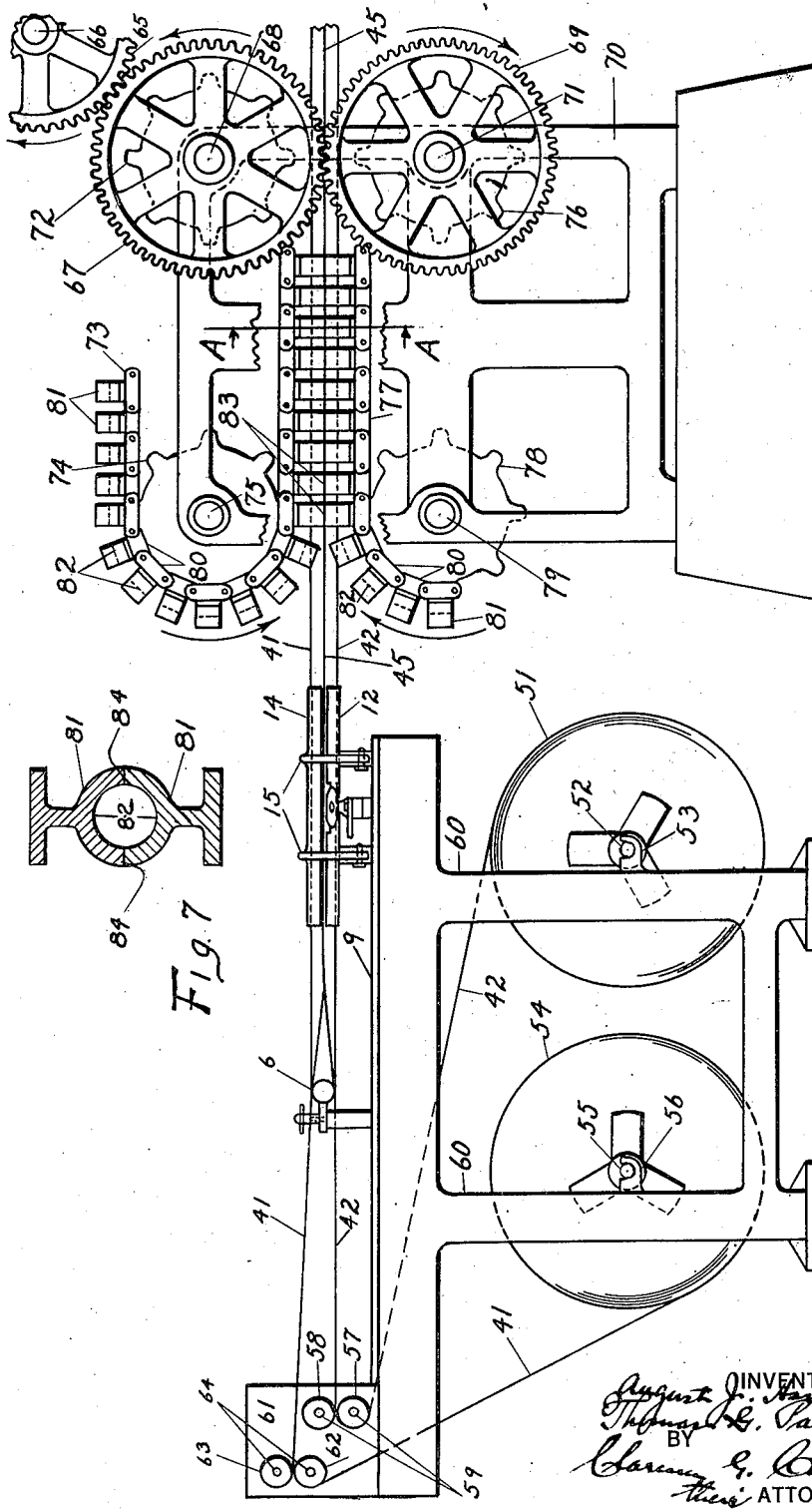

Patented Aug. 4, 1936

2,049,756

UNITED STATES PATENT OFFICE 2,049,756

APPARATUS FOR CONTINUOUSLY WRAPPING ICE CREAM OR OTHER PRODUCTS

August J. Asmussen and Thomas G. Paolillo, Brooklyn, N. Y.

Original application October 29, 1934, Serial No. 750,432. Divided and this application March 5, 1935, Serial No. 9,364

11 Claims. (Cl. 93—82)

Our invention relates to an improvement in an apparatus for continuously wrapping ice cream or other products and its novelty consists in the means for carrying out the same.

It is a division of our application Serial No. 750,432 filed Oct. 29, 1934 which has matured into Patent No. 2,014,961, September 17, 1935 and is divided out and filed as a separate application in accordance with the requirement of the Patent Office in said application.

There is now on the market a paper tube forming and filling machine for wrapping ice cream or other products continuously, known as the Clarence W. Vogt machine and made under United States Patents Nos. 1,801,740, 1,801,863, 1,801,864 and 1,906,183 but it uses glue in securing the wrapper together. This is objectionable because it is unhygienic because the glue contaminates the material in the container and also because it either does not stay fastened with sufficient security if inadequately glued or is too difficult to remove if glued too much.

Our apparatus solves these problems and furnishes a new wrapper or container which is positively locked or fastened together so that the fastening is very strong against inside pressure but fragile when pulled apart on the outside as is desired in unwrapping the container.

Referring to the drawings Figure 1 is a top plan view of our mechanism as it is attached in position on said patented Vogt paper tube forming and filling machine.

Figure 2 is a side elevation of the lifting mechanism of the upper shoe.

Figure 3 is a perspective of the complete paper tube or container made by our apparatus.

Figure 6 is a side elevation of our complete mechanism showing the paper feeding and pulling mechanism.

Figure 7 is a vertical sectional view on the line A—A of Figure 6.

Figure 4:
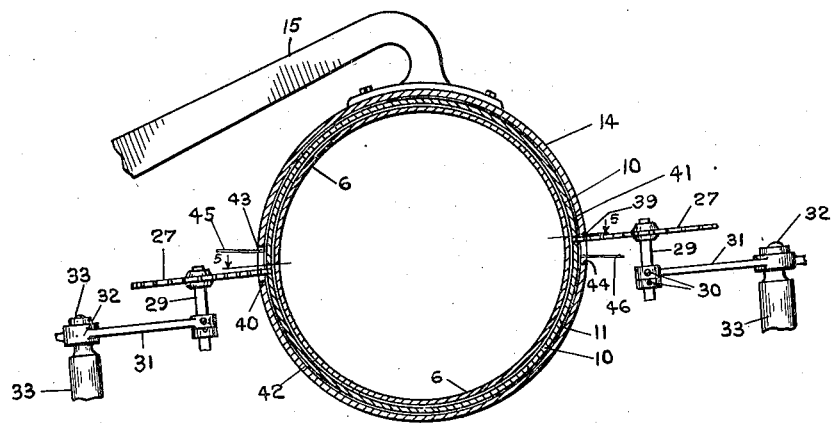
Figure 4 is a vertical cross sectional view on the line 4—4 of Figure 1.
Figure 5:
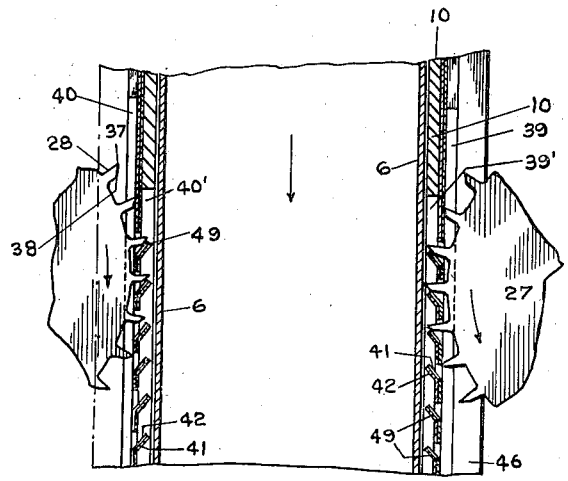
Figure 5 is a horizontal cross sectional view of Figure 4 on the line 5—5.

In the drawings 6 is a hygienic ice cream or other material filling tube of said Vogt paper tube forming and filling machine rigidly mounted in a fixed position by means of the clamping bracket 7 of usual construction, which is rigidly secured at 8 to a floor or base 9 in the usual well known manner. An inner forming tube 10, also held rigidly in position by brackets 7, is mounted over said hygienic tube 6 with a very slight insulating space of air between. A lower or bottom shoe 11 constituting the outer lower half of an outer forming tube is held rigidly in a fixed position by means of supporting brackets 12 secured in the usual well known manner at 13 to the base or floor 9 so that it is immediately around the lower half of the inner forming tube 10. An upper shoe 14 completing the outer forming tube with the lower shoe 11 is mounted thereon by means of arms 15 which terminate in plates 16 at one end which are rigidly secured at 17 to the said upper shoe 14 and are pivoted by means of the usual bearings on shafts 18 in the heads of brackets 19 rigidly secured at 20 in the well known manner to the plate or floor 9. These arms 15 are counter balanced by adjustable weights 21 mounted thereon in the usual well known manner with set screws 22, so that said upper shoe 14 can be raised and lowered quickly and easily. The upper shoe 14 also has slotted ears 23 which are in alignment with similar ears 24 integral with the lower shoe 11 and which carry clamping bolt members 25 with a spring member 26 under the ears 24 on said bolt so as to permit of an easy riding of said upper shoe 14 on said lower shoe 11 as the paper tube being formed passes therethrough.

A pair of circular plates 27 having puncturing or piercing teeth 28 arranged around the entire outer periphery of said circular plates are mounted on shafts 29 so as to rotate freely thereon, and said shafts 29 are rigidly secured at 30 in the usual well known manner to the arms 31, which in turn are pivoted at 32 in the usual manner on the posts 33 so as to turn freely thereon, and said arms 31 have handles 34 extending from the outer ends thereof so that said toothed plates 27 can be swung out of engagement as desired. There are also limiting elements 35 rigidly secured at 36 to the plate or floor 9 so as to prevent the toothed plates 27 from swinging beyond the desired point for effecting the piercing of the paper tube and interlocking of the same. The teeth 28 have their highest point 37 in the rear portion of the tooth 28 as it rotates with the tubular container being formed in our device and the high point 37 runs down to a low point 38 at the front of the tooth 28 as it rotates.

There is a slot 39 cut through the upper shoe 14 at the right side of Figure 4 as shown in the drawings, and a narrow shearing slot 39' on the side of the inner forming tube 10 for the teeth 28 of the plate 27, and a slot 40 on the left hand side of Figure 4 through the lower shoe 11 and a narrow shearing slot 40' on the side of the inner forming tube 10 for the clearance of the teeth 28 on the plate 27 on that side.

A roll of paper 51 mounted on shaft 52 in brackets 53 mounted on frame 60 which supports the base or floor 9 is adapted to continuously supply the under strip of paper 42 around idler roller 57 and under idler roller 58 mounted in the usual way on shafts 59 in sub-frame member 61, and a second roll of paper 54 mounted on shaft 55 in brackets 56 also supported on the frame 60 is adapted to continuously supply the upper strip of paper 41 to our mechanism over idler roller 62 and under idler roller 63 supported on shafts 64 mounted in the usual manner in said sub-frame 61.

The paper pulling mechanism is shown at the right hand end of Figure 6 and has a driving gear 65, broken away for convenience in illustration, mounted in the usual way on the driven shaft 66 being connected to a source of power not shown. Said driving gear 65 meshes with driven gear 67 rigidly mounted on the shaft 68 in the usual well known manner, which in turn is supported in the sub-frame 70 and a second driven gear 69 rigidly mounted in the usual manner on shaft 71 supported in said sub-frame 70 is in mesh with driven gear 67 whereby driving gear 65 travels clockwise and driven gear 67 in mesh therewith travels counter clockwise, and driven gear 69 in mesh with driven gear 67 travels clockwise. A sprocket 72 also rigidly mounted on said shaft 68 travels therewith and a chain 73, which for convenience in drawing is shown broken at both ends, travels over said sprocket 72 and also over sprocket 74 mounted on shaft 75 which is supported in said sub-frame 70 in the usual well known manner so as to rotate freely therein. A sprocket 76 is also rigidly secured to shaft 71 and a second chain 77, which is also shown broken for convenience in illustration, travels over said sprocket 76 at one end and over a second sprocket 78 at the other end, which sprocket 78 is mounted on shaft 79 in turn mounted in the well known manner in said sub-frame 70 so as to rotate freely therein. The chains 73 and 77 are composed of links 80 each of which has a flange or pressing member 81 secured thereto which have gripping lips 84 at each side and semi-circular cut out portions 82 in the middle sections adapted to fit over and not contact with the continuously formed cylindrical container. These upper and lower flange or gripping members 81 as they come tightly together at 83 as to their outer edges or lips 84 will grasp by said pairs of aligned lips 84 in Figure 6 the flange 45 and as to the other pair of lips 84 on the far side of Figure 6 grasp the flange 46 so as to pull and feed along the said continuously formed cylindrical container.

In operating our device as described in conjunction with the Vogt paper tube forming and filling machine, a strip of paper 41 will be run from the usual reel holding the same (as shown in Fig. 6) over the inner forming tube 10 and the shoe 14 will be raised by means of the pivoted arms 15 so that said upper strip of paper 41 may be placed in position over said inner forming tube 10 and the shoe 14 will then be lowered into position thereover, and an under strip of paper 42 will be drawn through over the under side of the inner forming tube 10 and under the lower outer shoe 11, and as there are slots 43 and 44 the under strip of paper 42 will project through said continuous slot 43 to form a flange 45, and the upper strip of paper 41 will pass through the continuous slot 44 forming an outer flange 46. It will also be apparent that the upper strip of paper 41 overlaps the under strip of paper 42 at 47 and that the under strip of paper 42 overlaps the upper strip of paper 41 at 48, (Figure 3). These overlapping portions 47 and 48 are where we desire to secure the two strips of paper 41 and 42 together to form the cylindrical container or tube for holding the ice cream or other product to be filled thereinto.

The two strips of paper 41 and 42 are gripped by the usual Vogt conveyor (see Figure 6) and pulled through the mechanism described in an absolute synchronism, thereby forming the continuous tubular paper tube or container for filling.

Our device locks and securely fastens together these two formed semi-tubular members 41 and 42 by means of the teeth 28 of the plates 27 which rotating in the same direction with the line of travel of said paper impinge upon said paper and pressing the same against the shearing edges of the slots 39' and 40' form a continuous series of punches or piercings through each side of the said overlapped portions 47 and 48 of the semi-tubular paper members 41 and 42, whereby the series of paper tabs 49 are projected inwardly and backwardly of the line of movement. These inwardly projected tabs 49 are flattened down as the tube is drawn on over the inner forming tube 10.

As the tube thus formed and secured together is filled with ice cream at a point beyond the Figure 1 shown herein where the hygienic tube 6 ends within said paper tube, the ice cream or other product will fill said paper tube, and as the inwardly turned tabs 49 have been somewhat flattened down they will be further flattened down and the slight openings filled by ice cream or other product being filled into said paper tube.

As the continuous tubular container formed thus by the interlocking tabs 49 in the overlapping side edge portions of paper strips 41 and 42 is filled by ice cream or some other product, it is drawn on to a point where it is cut off in desired lengths and carried forward for further treatment as may be desired.

It will be particularly noted that the entirely novel container as shown in Figure 3 resulting from our process and apparatus has a continuous row of tabs 49 on each side projecting inwardly slightly and which, as the container is put under pressure from the inside, causes said interlocked tabs to merely pull sidewise, causing a binding of the projecting tabs on the sides of the double hole in the two strips 41 and 42, and that the strength of this interlocking in that direction is more than could be overcome by any intended use of said container for ice cream or other product.

However, if the two flanges 45 and 46 are taken between the fingers of each hand and pulled gently, the tabs 49 are easily and without resistance lifted up and out of the holes made by piercing strips 41 and 42 because of the direction of the pull or tension. Thus the novel container 50 formed by our apparatus completely solves the problem of a hygienic container having more than the recognized strength for holding the ice cream or other product perfectly for shipment and handling but being subject to quick and easy opening for use.

It will be apparent that a metal adaptable to the piercing and bending out of tabs may be used in our apparatus instead of a paper-like material and that many variations may be made in our invention without departing from the spirit and intent of the same.

We claim:

1. In an automatic machine for continuously forming a cylindrical hygienic container over a tube carrying the material to be placed in the said container, a forming tube spaced thereover, a permanently secured lower shoe formed around the under side of said forming tube and a pivoted upper shoe mounted in alignment with said lower shoe around the upper side of said forming tube, slots cut in the upper shoe on one side and in the lower shoe on the other side, shearing slots cut in each side of said forming tube in alignment with said first pair of slots and a pair of circular toothed wheels mounted so as to rotate freely as said toothed wheels engage overlapped paper in said slots.

2. In a continuous paper-like container making machine means for forming continuously an upper and a lower continuous half with each having a flange on the side edge and adjacent overlapping portions and means for securing said overlapped portions together by forming a continuous row of interlocked tabs from said overlapped portions comprising a tube carrying the material to be placed in the said container, a forming tube spaced thereover, a permanently secured lower shoe formed around the under side of said forming tube and a pivoted upper shoe mounted in alignment with said lower shoe around the upper side of said forming tube, slots cut in the upper shoe on one side and in the lower shoe on the other side, shearing slots cut in each side of said forming tube in alignment with said first pair of slots and a pair of circular toothed wheels mounted so as to rotate freely as said toothed wheels engage overlapped paper in said slots.

3. In an automatic machine means for continuously forming a cylindrical container of two continuously pulled strips of flexible material and locking said strips together continuously along their overlapped side edges by a continuous row of interlocked punched out pairs of tabs of said overlapped strips comprising a tube carrying the material to be placed in the said container, a forming tube spaced thereover, a permanently secured lower shoe formed around the under side of said forming tube and a pivoted upper shoe mounted in alignment with said lower shoe around the upper side of said forming tube, slots cut in the upper shoe on one side and in the lower shoe on the other side, shearing slots cut in each side of said forming tube in alignment with said first pair of slots and a pair of circular toothed wheels mounted so as to rotate freely as said toothed wheels engage overlapped paper in said slots.

4. In an automatic machine means for continuously forming an upper and a lower continuously fed strip of flexible material into semicylindrical continuous members with each having a continuous flange formed on opposite side edges and continuous overlapping portions adjacent said flange and fastening same together by a continuous row of interlocked tabs punched out of said overlapped portions comprising a tube carrying the material to be placed in the said container, a forming tube spaced thereover, a permanently secured lower shoe formed around the under side of said forming tube and a pivoted upper shoe mounted in alignment with said lower shoe around the upper side of said forming tube, slots cut in the upper shoe on one side and in the lower shoe on the other side, shearing slots cut in each side of said forming tube in alignment with said first pair of slots and a pair of circular toothed wheels mounted so as to rotate freely as said toothed wheels engage overlapped paper in said slots.

5. In an automatic machine means for continuously making a tubular container of paper by forming two continuous longitudinal semi-tubular halves and continuously securing their overlapping side edges together by forming a continuous row of interlocked tabs from said overlapped portions comprising a tube carrying the material to be placed in the said container, a forming tube spaced thereover, a permanently secured lower shoe formed around the under side of said forming tube and a pivoted upper shoe mounted in alignment with said lower shoe around the upper side of said forming tube, slots cut in the upper shoe on one side and in the lower shoe on the other side, shearing slots cut in each side of said forming tube in alignment with said first pair of slots and a pair of circular toothed wheels mounted so as to rotate freely as said toothed wheels engage overlapped paper in said slots.

6. In an automatic machine means for continuously forming a cylindrical container of two continuously pulled strips of material and locking said strips together continuously along their overlapped side edges by a continuous row of interlocked punched out pairs of tabs of said overlapped strips of material comprising a tube carrying the material to be placed in the said container, a forming tube spaced thereover, a permanently secured lower shoe formed around the under side of said forming tube and a pivoted upper shoe mounted in alignment with said lower shoe around the upper side of said forming tube, slots cut in the upper shoe on one side and in the lower shoe on the other side, shearing slots cut in each side of said forming tube in alignment with said first pair of slots and a pair of circular toothed wheels mounted so as to rotate freely as said toothed wheels engage overlapped paper in said slots.

7. In a continuous paper-like container making machine for forming continuously a hygienic container adapted for continuous filling, means for forming an upper and a lower continuous container half between a forming tube and a movable upper and a fixed lower shoe mounted on said tube, means for forming a flange on the opposite side edges of said upper and said lower half so that the portions adjacent to said flanges overlap the adjacent portions of the other container half comprising slots in said upper and lower shoes and means for securing said overlapped portions together by forming a continuous row of interlocked tabs from said overlapped portions, said securing means including a plurality of rotating tab punching wheels.

8. In an automatic machine for continuously forming a cylindrical container comprising means for pulling two strips of flexible material through an upper and a lower half of a cylindrical forming mechanism and means for locking said strips together continuously along each pair of their overlapped side edges by means of a rotating tab punching wheel arranged to engage each of said overlapped portions and form a continuous row of interlocked punched out pairs of tabs of said overlapped strips.

9. In an automatic machine means for continuously forming an upper and a lower continuously fed strip of flexible material into semi-cylindrical continuous members between a forming tube and a movable upper and a fixed lower shoe mounted over said tube, slot means in said shoes for forming a continuous flange on opposite side edges of said strips and continuous overlapping portions of portions adjacent said flange and the adjacent strip and a pair of rotating tab punching wheels arranged on either side of said shoes for fastening said overlapping portions together by a continuous row of interlocked tabs punched out of said overlapped portions.

10. In an automatic machine means for continuously making a tubular container of paper comprising an endless chain of gripping members for pulling an upper and a lower strip of paper through a forming means having an upper and a lower shoe mounted over a forming tube so as to form two continuous longitudinal semi-tubular halves and continuously securing their overlapping side edges together by means of a rotating tab punching wheel engaging each of said pairs of overlapping side edges and forming a continuous row of interlocked tabs from said overlapped portions.

11. In an automatic machine means for continuously forming a cylindrical container comprising an endless chain of gripping members for pulling continuously two strips of material and means for locking said strips together continuously on each side along their overlapped side edges by a continuous row of interlocked punched out pairs of tabs of said overlapped strips of material consisting of a rotating tab punching wheel adjacent to and engaging said overlapped side edges on each side.

AUGUST J. ASMUSSEN.
THOMAS G. PAOLILLO.